March 14, 1967 L. LUYTEN 3,309,589
ELECTRICAL DEVICE FOR PRECISELY POSITIONING A REMOTE COMPONENT
Filed Nov. 14, 1963 2 Sheets-Sheet 1
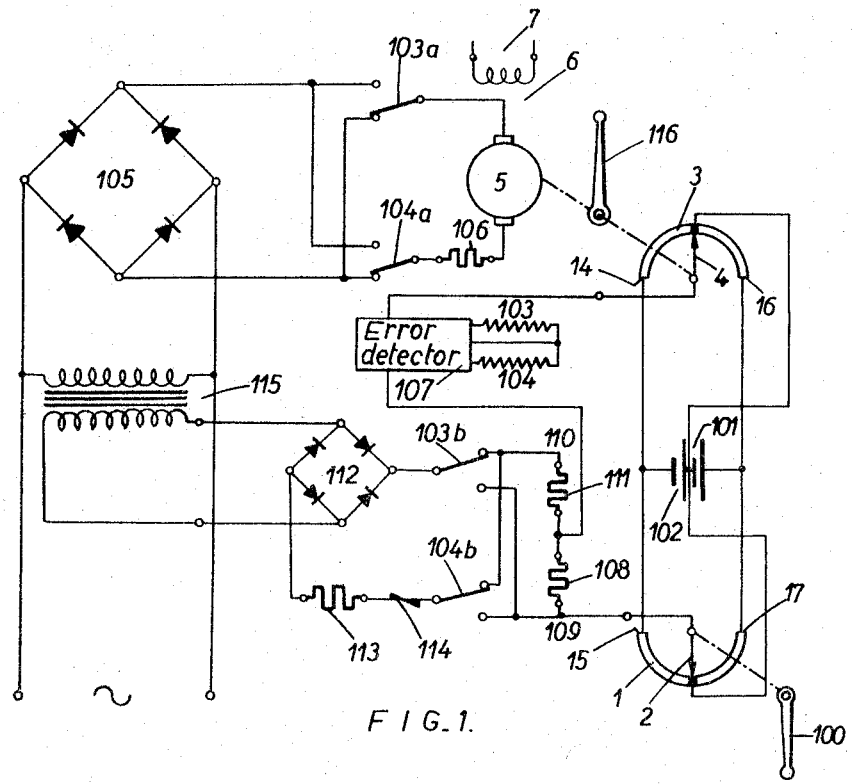
FIG_1.
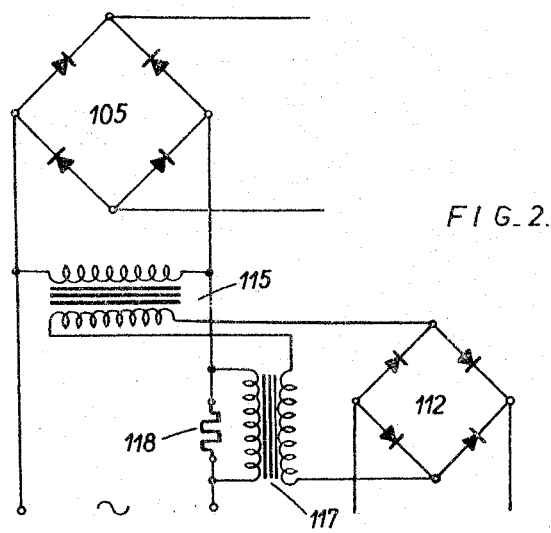
FIG_2.
INVENTOR
LOUIS LUYTEN
BY
ATTORNEYS

United States Patent Office 3,309,589
Patented Mar. 14, 1967

3,309,589
**ELECTRICAL DEVICE FOR PRECISELY POSITION-
ING A REMOTE COMPONENT**
Louis Luyten, Brussels, Belgium, assignor to "Electricite,
Mecanique et Applications" (E.M.A.), Brussels, Belgium, a Belgian company
Filed Nov. 14, 1963, Ser. No. 323,692
Claims priority, application Belgium, Nov. 23, 1962,
625,241
5 Claims. (Cl. 318—28)

This invention relates to an electrical device for precisely positioning a remote component, comprising a transmitter on which the order or the position to be reproduced at the remote component may be set, a D.C. electric servomotor driving a receiver united with the component to be positioned, an electrical bridge circuit in which the potential across the end of the measuring diagonal represents an error signal and depends on the deviation in position between the receiver and the transmitter, a sensitive element, called an "error detector," connected in the measuring diagonal and controlling the servomotor, a compensating device depending on the operating conditions of the servomotor and influencing the error detector being directly inserted in the measuring diagonal.

Such a device has a wide technical field of application. It can be used whenever some mechanical component is to be placed at will in any one of the plurality of positions. It may serve to adjust the height of a component, or its angle of inclination, or its degree of separation from a reference point. It can be employed to actuate the flow control member of a variable flow pump, or to actuate a rheostat or any other apparatus enabling the regulation of a mechanical, electrical or hydraulic magnitude or the like.

In known installations of this kind, the compensating device is formed by a tachometer-generator located on the servomotor shaft. This arrangement has disadvantages of two kinds: on the one hand, a tachometer-generator is an expensive device in which the possibility of adjusting its parameters is practically nil, and which must be located in a precise place in the installation, i.e. on the servomotor shaft which is subjected to the vibrations of the latter as well as the component to be positioned; on the other hand, the compensating signal it generates is proportional only to the speed of the servomotor.

The present invention has for its purpose to avoid such disadvantages by aming at simplicity of the means employed and the precision of the positioning of the component to be positioned, irrespective of the external factors acting upon this component, the compensating signal being not only proportional to the real instantaneous speed of the servomotor, but also proportional to the braking travel of the servomotor, so that the latter, at the end of the braking, will place the component to be positioned in a position corresponding precisely to a zero error signal.

For this purpose, in the device according to the invention, the compensating device comprises a resistor in series with the error detector and which is traversed by a current dependent on the armature voltage of the servomotor, and a passive element having a non-linear current/voltage characteristic, inserted in the circuit of the resistor.

According to an advantageous embodiment of the invention, the compensating device also comprises a second resistor in series with the error detector and which is traversed by a current which is dependent on the armature current of the servomotor.

According to a preferred embodiment of the invention, the electric control circuit of the servomotor, i.e. the circuit comprising the transmitter, the receiver, the electrical bridge, the error detector and the compensating device is electrically insulated from the electric supply circuit of the servomotor.

To achieve this, the servomotor armature is fed from an alternating voltage source through a rectifier assembly, and the current dependent on the armature voltage of the servomotor is taken from a secondary winding of a transformer whose primary winding is connected in the supply circuit of the servomotor at the input side of the said rectifier assembly, in the output of which is inserted a passive element having a non-linear current/voltage characteristic together with a changeover switch actuated by the error detector and the resistor inserted also in the measuring diagonal of the electrical bridge.

The reliability of an installation provided with a device in accordance with the invention is thus increased, while permitting the use of components in the control circuit for which conditions of service demanded are less severe.

Various embodiments of the device according to the invention will now be described, by way of example, with reference to the accompanying drawings, in which FIG. 1 shows an electrical circuit diagram of a device according to the invention.

FIG. 2 shows a modified form of the circuit of FIG. 1.

It should be noted that, in order to clarify the drawings, the relays and the contacts they control have not been shown in adjacent positions, but the same reference numeral has been allocated to the relay and the controlled contacts with an additional suffix *a*, *b*, etc., for the contacts.

Figure 3:
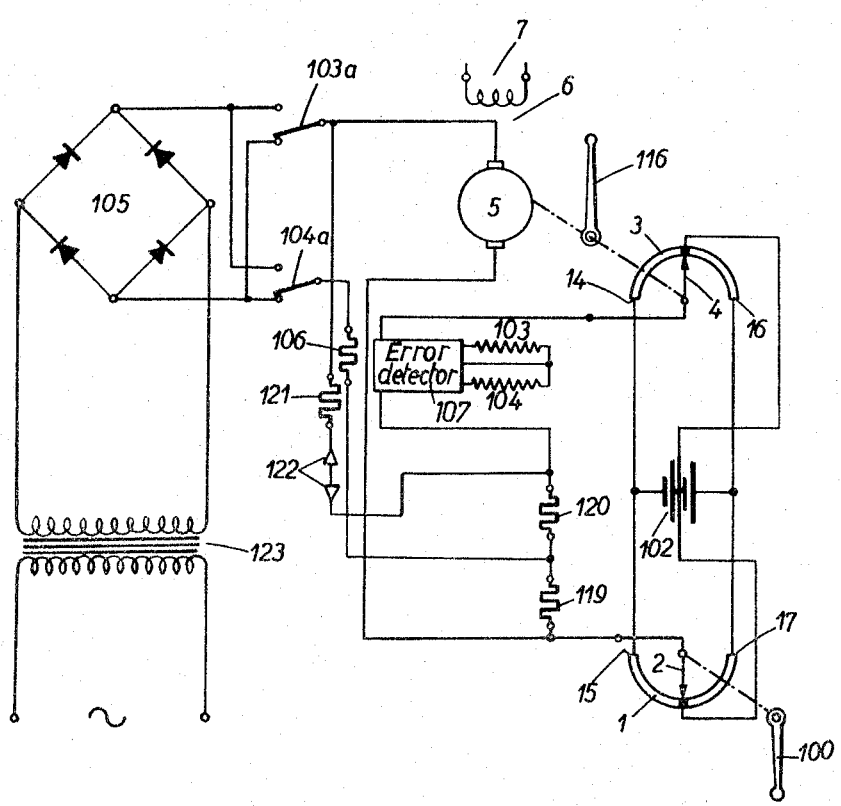
FIG. 3 shows a second electrical circuit diagram of a device according to the invention.

The arrangement shown in FIGURE 1 comprises a transmitter potentiometer 1, the slider 2 of which is coupled mechanically with a control lever 100, as well as a receiver potentiometer 3, the slider 4 of which is mechanically coupled to the armature 5 of a D.C. electric servomotor 6 having a field winding 7, and to the component 116 to be positioned.

The mid-points of the potentiometers 1 and 3 are joined to the middle tapping 101 of a group of batteries 102, to the end terminals of which are joined the corresponding ends 14, 15 and 16, 17 respectively, of the two potentiometers. By joining, as described hereinafter, a sensitive element 107 (referred to as an "error detector") between the sliders 2 and 4, a double measuring bridge is formed.

The servomotor field winding 7 is permanently connected to a D.C. supply, whereas the armature 5 is connected to movable reversing contacts 103a, 104a controlled by directional relays 103, 104 as described hereinafter. The stationary members of the reversing contacts are connected to the D.C. terminals of a rectifier assembly 105 supplied from an A.C. source. The reversing contacts 103a, 104a of the relays 103, 104 are so arranged that when relay 103 is energized, the servomotor 5 will have say a clockwise rotation, whereas if the relay 104 is energized, the relay 103 being de-energized, the connection polarities are reversed and the direction of rotation of the servomotor 6 is opposite to the previous direction. When neither of the relays 103, 104 is energized, the armature 5 of the servomotor 6 is short-circuited through a braking resistance 106, the value of which depends on the desired braking force. The coils of the relays 103, 104 are connected to the output of the error detector 107, having a characteristic + or −, formed for example by an electronic amplifier, inserted in the common diagonal of the two electric bridges, i.e. between the sliders 2 and 4. One or the other of the coils of the relays 103, 104, is energized depending on the polarity of the signal applied to the input of the error detector.

In the measuring diagonal of the two electric bridges, is connected, in series with the error detector 107, a resistor 108 forming part of a voltage divider 109, 110 comprising the resistor 108 and a second resistor 111. The voltage divider 109, 110 is connected to the stationary contacts of the auxiliary reversing contacts 103b, 104b arranged so as to connect or disconnect the terminals 109, 110 of the voltage divider to the D.C. supply terminals of the auxiliary rectifier assembly 112 via resistor 113 and a passive element of non-linear current/voltage characteristic shown here in the form of a varistor 114. The rectifier assembly 112 is fed by the secondary winding of a transformer 115, the primary of which is connected to the A.C. terminals of the rectifier assembly 105. When neither of the relays 103, 104 is energized, the voltage divider 109, 110 is disconnected from the D.C. terminals of the rectifier assembly 112. When relay 103 is energized, the reversing contact 103b operates and the D.C. voltage of rectifier assembly 112 is applied via the resistor 113 and the varistor 114 to the terminals of the voltage divider, the potential drop being in the direction 109 to 110. When the relay 104 is energized, the reversing contact 104b operates, and the D.C. voltage of the rectifier assembly 112 is applied via the resistor 113 and the varistor 114 to the voltage divider with change of polarity with respect to the previous case, the potential drop being in the direction 110 to 109.

The device operates as follows: when a position to be transmitted is set on the control lever 100, which drives the slider 2 of the potentiometer 1 to this position, an out of balance voltage occurs in the measuring diagonal of the two electric bridges between the sliders 2 and 4; this voltage represents the error signal and is proportional to deviation of position between the component 116 to be positioned and the position set on the control lever 100. Assume that the control lever 100 has been moved so that the slider 2 has been moved towards the end 17 of the potentiometer 1. A difference of potential appears at the terminals of the common diagonal of the electric bridges, the terminal corresponding to the slider 2 being positive with respect to that corresponding to the slider 4. The error detector 107 receives the error signal and the relay 104 is energized to set the servomotor rotating in a clockwise direction. The slider 4 is displaced in the direction of increasing voltage so that the error signal will decrease progressively and proportionally with the deviation of position. When relay 104 is energized, the contact 104b operates, producing a voltage drop across the terminals of the resistor 108 connected in series with the error signal and the error detector. This voltage drop which represents the compensating signal is deducted from the error signal so that the signal appearing at the input terminals of the error detector 107 is less in absolute magnitude than the error signal itself. It follows that the control signal (i.e. that signal appearing at the input terminals of the error detector 107) will cancel out before cancellation of the error signal.

Consecutively with the cancellation of the control signal, the relay 104 will be deenergized, and the servomotor will be braked because its armature 5 is short-circuited, this braking thus commencing before the servomotor has reached its final position corresponding to a zero error signal. The resistors 108, 111, 113, the varistor 114, the rectifier assembly 112, and the transformer 115 are dimensioned so that the deviation of position between the component 116 to be positioned and the control lever 100, existing at the moment when the braking commences, is substantially equal to the braking travel of the servomotor, so that at the end of the braking, the servomotor is in the position corresponding to a zero error signal. The non-linear element 114 has for its purpose to effect the braking as described above, whatever may be the value of the A.C. voltage applied to the rectifier assembly 105, so as to take into account, that the braking distance of a motor depends in a non-linear manner on the armature voltage existing at the instant when the braking commences.

According to the modified circuit shown in FIGURE 2, which is used in the case where the resisting torque applied to the servomotor is susceptible of considerable variation, a second transformer 117 is connected in the supply circuit of the servomotor on the input side of rectifier assembly 105. The primary winding of the transformer 117 is connected in parallel with a resistor 118 traversed by the A.C. current feeding the rectifier assembly 105, the secondary winding of the transformer 117 being connected in series with the secondary winding of the transformer 115, so that the addition of the transformer 117 has the effect of decreasing the total voltage available at the terminals of the non-common ends of the two secondary windings of the transformers 115 and 117. These ends are connected to the A.C. supply terminals of the rectifier assembly 112, the rest of the circuit being identical with that described previously with reference to FIGURE 1.

The purpose of the transformer 117 is to compensate the effect of the resisting torque applied to the servomotor 6. In fact, when the resisting torque is large, the braking distance decreases for the same D.C. supply voltage to the motor (and thus for the same A.C. supply voltage). Therefore, to achieve the braking conditions previously described, the greater the resisting torque, the greater the extent it is necessary to decrease the compensating signal, which is achieved by a decrease in the A.C. voltage applied to the rectifier assembly 112, the decrease being proportional to the A.C. current feeding the rectifier assembly 105, thus proportional to the D.C. current flowing through the armature, which in its turn is substantially proportional to the resisting torque applied to the servomotor.

According to the modified circuit shown in FIGURE 3, two resistors 119, 120 are inserted in the common diagonal of the electric bridges in series with the error detector 107. The resistor 120 is on the other hand included in a circuit connected in parallel with the supply circuit of the armature 5, through the intermediary of a resistor 121 and an element of non-linear current/voltage characteristic, such as a pair of Zener diodes, at the output side of the reversing contacts 103a and 104a; the resistor 119 is arranged in series in the feed circuit of the armature 5 on the output side of the contacts 103a and 104a.

In the A.C. supply circuit of the rectifier assembly 105, there is shown a transformer 123 the presence of which is optional.

The result obtained by means of the device of FIGURE 3 is similar to that obtained with the device of FIGURE 2, the compensating signal which depends on the armature voltage and the armature current of the servomotor being however, according to the circuit of FIGURE 3, taken by an electrical connection directly in the armature supply circuit of servomotor 6.

I claim:

1. An electrical device for precisely positioning a remote component comprising a master unit including transmitting means, at least one remote component including receiving means, means to set on said transmitting means information to be reproduced at said remote component, a D.C. electric servomotor operatively connected to drive said receiving means and said remote component, said transmitting means and said receiving means forming an electrical bridge circuit, a deviation of information between the receiver and the transmitter appearing as an electrical potential across a measuring diagonal of said electrical bridge, an error detector, said error detector being connected to said measuring diagonal and controlling the direction of operation of said servomotor, said servomotor having a non-linear braking characteristic, a compensating device connected betwen the servomotor and said error detector to control the latter in response to the operating condition of the former, said compensating device comprising a resistor in series with said error detector, and an element having a non-linear current/voltage characteristic depending on the braking characteristic of the servomotor, said element being connected in series with said resistor, a current dependent on the armature voltage of the servomotor traversing said resistor and said element.

2. A device according to claim 1 in which said compensating device comprises a second resistor connected in series with said error detector and a current which is dependent on the armature current of said servomotor traversing said second resistor.

3. A device according to claim 1 wherein said transmitting means and said receiving means comprise potentiometers the corresponding ends of which are connected sources of equal potential, mid-points on said potentiometers being connected to a common potential so as to form two distinct electrical measuring bridges, and wiper arms of said potentiometers being interconnected to form a common measuring diagonal.

4. A device according to claim 1 in which a rectifier is connected to supply A.C. voltage to an armature of the servomotor, a first transformer, the secondary winding of said transformer supplying the current dependent on the armature voltage of the servomotor, the primary being connected to a supply circuit of the servomotor on the input side of said rectifier, the secondary winding being connected to an auxiliary rectifier assembly the output of which is connected to a passive element of non-linear current/voltage characteristic depending on the braking characteristic of the servomotor, reversing contacts controlled by said error detector, and a resistor which is inserted in the measuring diagonal of said electrical bridge.

5. A device according to claim 4 wherein said secondary winding of the first transformer is connected to the secondary winding of a second transformer whose primary winding is connected to the terminals of an impedance arrangement in series with the armature supply current of the servomotor on the input side of the rectifier assembly.

References Cited by the Examiner
UNITED STATES PATENTS
3,100,277   8/1963   McCullough _____ 318—448 X ORIS L. RADER, *Primary Examiner.*

J. F. COUCH, BENJAMIN DOBECK, *Examiners.*